United States Patent
Kronrod et al.

(10) Patent No.: US 12,236,097 B2
(45) Date of Patent: Feb. 25, 2025

(54) STORAGE MANAGEMENT SYSTEM AND METHOD

(71) Applicant: Dell Products L.P., Round Rock, TX (US)

(72) Inventors: Svetlana Kronrod, Concord, MA (US); Vamsi K. Vankamamidi, Hopkinton, MA (US); Michael P. Wahl, Bulverde, TX (US); James H. Shimer, Georgetown, MA (US)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/160,603

(22) Filed: Jan. 27, 2023

(65) Prior Publication Data
US 2024/0256141 A1    Aug. 1, 2024

(51) Int. Cl.
*G06F 3/06* (2006.01)

(52) U.S. Cl.
CPC .......... *G06F 3/0613* (2013.01); *G06F 3/0611* (2013.01); *G06F 3/0653* (2013.01); *G06F 3/067* (2013.01)

(58) Field of Classification Search
CPC .... G06F 3/0613; G06F 3/0611; G06F 3/0653; G06F 3/067
See application file for complete search history.

(56) References Cited

U.S. PATENT DOCUMENTS

| | | | |
|---|---|---|---|
| 9,785,360 B1* | 10/2017 | Ravindranath | G06F 3/0659 |
| 2017/0017575 A1* | 1/2017 | Razin | G06F 12/0868 |
| 2020/0183624 A1* | 6/2020 | Enz | G06F 3/0659 |
| 2022/0222155 A1* | 7/2022 | Kamran | G06F 11/1425 |
| 2022/0229582 A1* | 7/2022 | Rao | G06F 3/0635 |
| 2022/0253251 A1* | 8/2022 | Neelakantam | H04L 67/566 |

* cited by examiner

*Primary Examiner* — Francisco A Grullon
(74) *Attorney, Agent, or Firm* — Brian J. Colandreo; Heath M. Sargeant; Holland & Knight LLP

(57) ABSTRACT

A method, computer program product, and computing system for receiving one or more IO requests on a storage system coupled to a cloud-based storage platform, wherein the cloud-based storage platform has a defined maximum IOPS rate; determining a current level of utilization of the defined maximum IOPS rate; and determining whether to queue the one or more IO requests for an aggregated write operation to the cloud-based storage platform based, at least in part, upon the current level of utilization of the defined maximum IOPS rate.

18 Claims, 3 Drawing Sheets

STORAGE MANAGEMENT SYSTEM AND METHOD

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible.

As storage is being migrated from onprem (i.e., on premises) to the cloud, technical hurdles often complicate things. For example, IOPS (input-output-operations-per-second) bottlenecks may be encountered that result in a level of latency that is undesirable when compared to onprem storage.

SUMMARY OF DISCLOSURE

In one implementation, a computer-implemented method is executed on a computing system and includes: receiving one or more IO requests on a storage system coupled to a cloud-based storage platform, wherein the cloud-based storage platform has a defined maximum IOPS rate; determining a current level of utilization of the defined maximum IOPS rate; and determining whether to queue the one or more IO requests for an aggregated write operation to the cloud-based storage platform based, at least in part, upon the current level of utilization of the defined maximum IOPS rate.

One or more of the following features may be included. Determining whether to queue the one or more IO requests for an aggregated write operation to the cloud-based storage platform may include: excluding from queuing consideration any read IO requests included within the one or more IO requests received. Determining whether to queue the one or more IO requests for an aggregated write operation to the cloud-based storage platform may further include: immediately processing the read IO requests included within the one or more IO requests received. A likelihood of queuing the one or more IO requests for the aggregated write operation to the cloud-based storage platform may generally increase as the utilization of the defined maximum IOPS rate is approached. The defined maximum IOPS rate may define a maximum number of IOPS per unit time. The current level of utilization of the defined maximum IOPS rate may identify the total IO requests and the breakdown between read IO requests and write IO requests. The storage system may be a log-based storage system.

In another implementation, a computer program product resides on a computer readable medium and has a plurality of instructions stored on it. When executed by a processor, the instructions cause the processor to perform operations including receiving one or more IO requests on a storage system coupled to a cloud-based storage platform, wherein the cloud-based storage platform has a defined maximum IOPS rate; determining a current level of utilization of the defined maximum IOPS rate; and determining whether to queue the one or more IO requests for an aggregated write operation to the cloud-based storage platform based, at least in part, upon the current level of utilization of the defined maximum IOPS rate.

One or more of the following features may be included. Determining whether to queue the one or more IO requests for an aggregated write operation to the cloud-based storage platform may include: excluding from queuing consideration any read IO requests included within the one or more IO requests received. Determining whether to queue the one or more IO requests for an aggregated write operation to the cloud-based storage platform may further include: immediately processing the read IO requests included within the one or more IO requests received. A likelihood of queuing the one or more IO requests for the aggregated write operation to the cloud-based storage platform may generally increase as the utilization of the defined maximum IOPS rate is approached. The defined maximum IOPS rate may define a maximum number of IOPS per unit time. The current level of utilization of the defined maximum IOPS rate may identify the total IO requests and the breakdown between read IO requests and write IO requests. The storage system may be a log-based storage system.

In another implementation, a computing system includes a processor and memory is configured to perform operations including receiving one or more IO requests on a storage system coupled to a cloud-based storage platform, wherein the cloud-based storage platform has a defined maximum IOPS rate; determining a current level of utilization of the defined maximum IOPS rate; and determining whether to queue the one or more IO requests for an aggregated write operation to the cloud-based storage platform based, at least in part, upon the current level of utilization of the defined maximum IOPS rate.

One or more of the following features may be included. Determining whether to queue the one or more IO requests for an aggregated write operation to the cloud-based storage platform may include: excluding from queuing consideration any read IO requests included within the one or more IO requests received. Determining whether to queue the one or more IO requests for an aggregated write operation to the cloud-based storage platform may further include: immediately processing the read IO requests included within the one or more IO requests received. A likelihood of queuing the one or more IO requests for the aggregated write operation to the cloud-based storage platform may generally increase as the utilization of the defined maximum IOPS rate is approached. The defined maximum IOPS rate may define a maximum number of IOPS per unit time. The current level of utilization of the defined maximum IOPS rate may identify the total IO requests and the breakdown between read IO requests and write IO requests. The storage system may be a log-based storage system.

The details of one or more implementations are set forth in the accompanying drawings and the description below. Other features and advantages will become apparent from the description, the drawings, and the claims.

DETAILED DESCRIPTION OF THE PREFERRED EMBODIMENTS

System Overview

Figure 1:
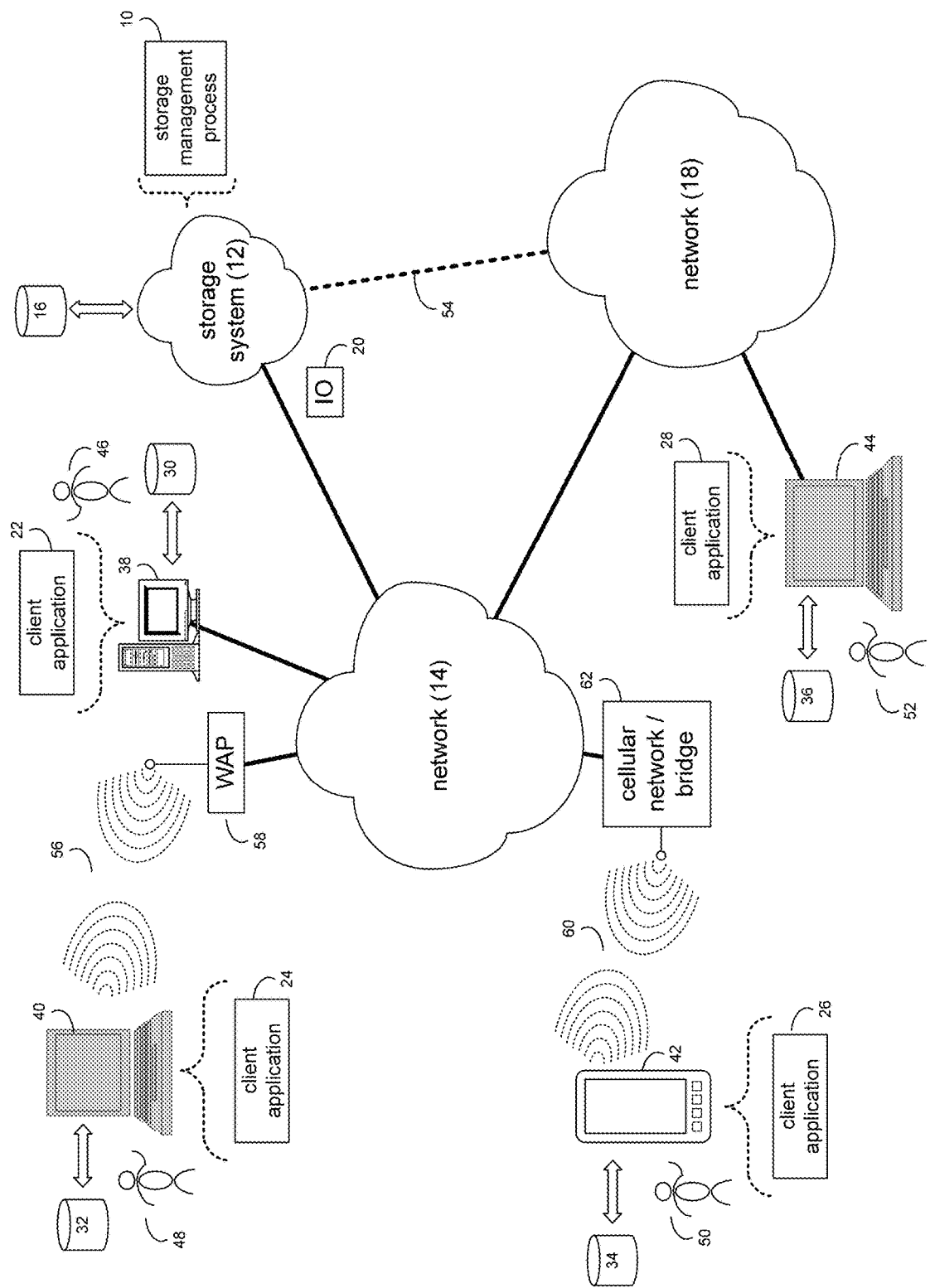
FIG. 1 is a diagrammatic view of a storage system and a storage management process coupled to a distributed computing network.

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random-access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
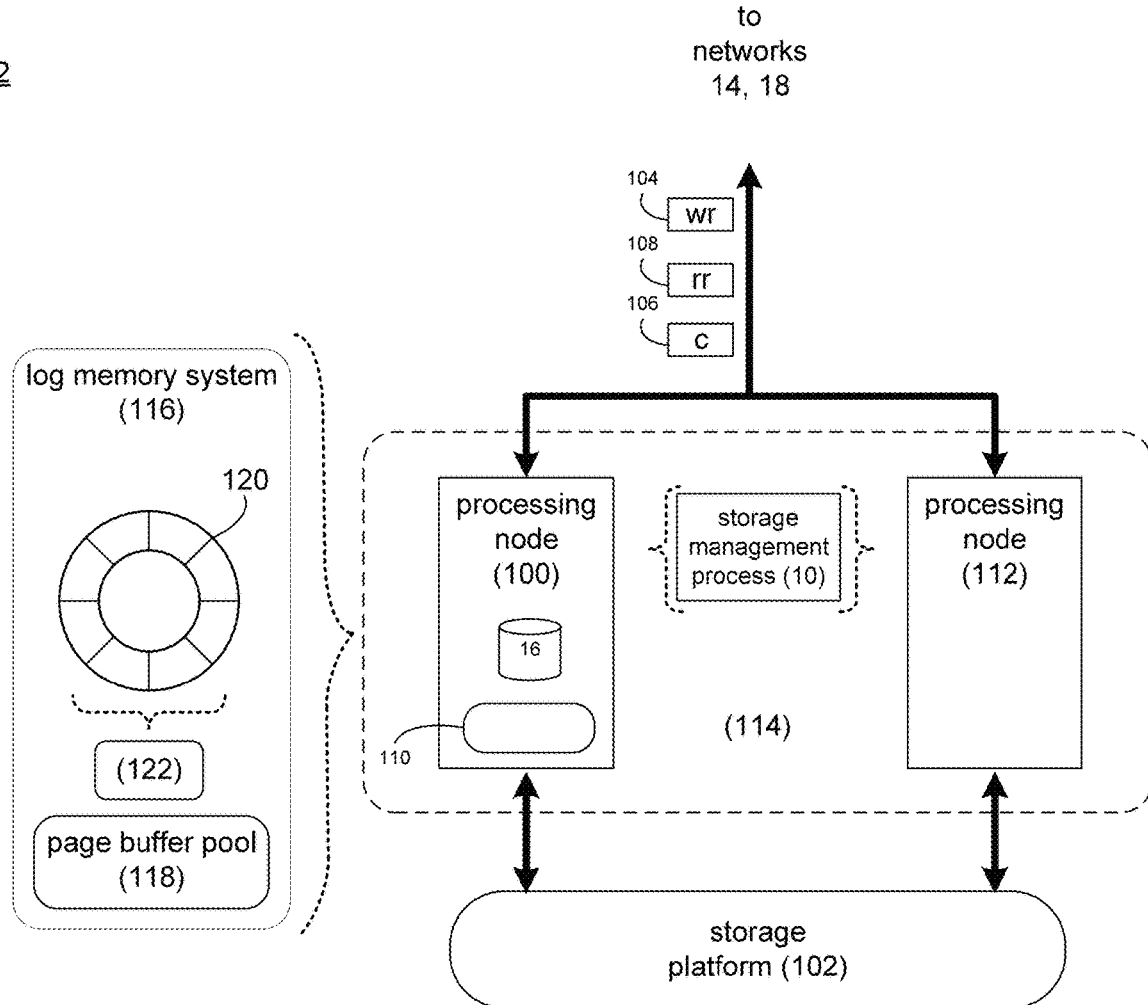
FIG. 2 is a diagrammatic view of the storage system of FIG. 1.

The Data Storage System:

Referring also to FIG. 2, there is shown a general implementation of storage system 12. In this general implementation, storage system 12 may include processing node 100, wherein processing node 100 may be configured to perform computational tasks and to store data within storage platform 102.

Depending upon the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability. Further, storage platform 102 may be a cloud-based storage platform that provides virtualized storage functionality to (in this example) users 46, 48, 50, 52.

As is known in the art, cloud storage is a model of computer data storage in which the digital data is stored in logical pools, said to be on "the cloud". The physical storage spans multiple servers (sometimes in multiple locations) and the physical environment is typically owned and managed by a hosting company. These cloud storage providers are responsible for keeping the data available and accessible, and the physical environment secured, protected, and running. People and organizations buy or lease storage capacity from the providers to store user, organization, or application data. Cloud storage services may be accessed through a collocated cloud computing service, a web service application programming interface (API) or by applications that use the API, such as cloud desktop storage, a cloud storage gateway or Web-based content management systems.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100. Storage device 16 may include but is not limited to: a hard disk drive; a RAID device; a random-access memory (RAM); a read-only memory (ROM); and all forms of flash memory storage devices.

As discussed above, various IO requests (e.g., IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e., a request that content 106 be written to storage system 12) and data read request 108 (i.e., a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100.

Processing node 100 may include cache memory system 110. Examples of cache memory system 110 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 106 within cache memory system 110. Depending upon the manner in which cache memory system 110 is configured, processing node 100 may immediately write content 106 to storage platform 102 (if cache memory system 110 is configured as a write-through cache) or may subsequently write content 106 to storage platform 102 (if cache memory system 110 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 112).

In some implementations, storage system 12 may include multi-node active-active storage clusters configured to provide high availability to a user. As is known in the art, the term "high availability" may generally refer to systems or components that are durable and likely to operate continuously without failure for a long time. For example, an active-active storage cluster (e.g., computing cluster 114) may be formed from at least two nodes (e.g., processing nodes 100, 112), both actively running the same kind of service(s) simultaneously. One purpose of an active-active cluster (e.g., computing cluster 114) may be to achieve load balancing. Load balancing may distribute workloads across all nodes in order to prevent any single node from getting overloaded. Because there are more nodes available to serve, there will also be a marked improvement in throughput and response times. Another purpose of an active-active cluster (e.g., computing cluster 114) may be to provide at least one active node in the event that one of the nodes in the active-active cluster fails.

Log-Based Storage System:

Storage system 12 may be configured as a log-based storage system. If so configured, storage management process 10 may store received data in a log memory system (e.g., log memory system 116). As is known in the art, a log memory system (e.g., log memory system 116) may generally include one or more non-volatile random-access memory (NVRAM) devices configured to store a log of the data written to storage system 12. Additionally/alternatively, the log of the data written to storage system 12 may be stored on a remote storage device (e.g., solid state storage on a backend device of the cloud storage provider).

As discussed above, an example of IO request 20 may include but is not limited to data write request 104 (i.e., a request that content 106 be written to storage system 12). Further and as discussed above, upon receiving data write request 104 and content 106, data write request 104 and content 106 may be written to cache memory system 110 (which may be volatile). However and when configured as a log-based storage system, upon receiving data write request 104 and content 106, data write request 104 and/or content 106 may also be written to log memory system 116 (which is persistent).

Therefore and through the use of log memory system 116, the content of cache memory system 110 (e.g., data write request 104 and content 106) may be recovered (via log memory system 116) in the event of a power failure and/or a failure of cache memory system 110. Further and due to such failure recoverability, data (e.g., content 106) may be considered to be persistently stored (i.e., as if stored in storage platform 102) once such data (e.g., content 106) is saved within log memory system 116. Therefore, once such data (e.g., content 106) is saved within log memory system 116, a write acknowledgement may be provided to the sender of data write request 104, acknowledging the successful saving of such data (e.g., content 106), wherein such data (e.g., content 106) may be subsequently written to storage platform 102.

Log memory system 116 may include a page buffer pool (e.g., page buffer pool 118) and/or a page descriptor ring buffer (e.g., page descriptor ring buffer 120) to effectuate the above-described temporary storage of (in this example) content 106. For example, storage management process 10 may store one or more pages (associated with content 106) in one or more page buffers within page buffer pool 118 based, at least in part, upon the processing of (in this example) write request 104. Further, storage management process 10 may store information concerning the data (e.g., content 106) stored within log memory system 116 in a page descriptor (e.g., page descriptor 122), wherein page descriptor 122 may generally include a reference (i.e., a pointer) to the related page buffer(s) within page buffer pool 118. Page descriptor 122 may also include a sequence transaction number that tracks the order of write operations and/or other types of information.

Storage management process 10 may store each page descriptor (e.g., page descriptor 122) in a page descriptor ring buffer (e.g., page descriptor ring buffer 120). As is known in the art, a page descriptor ring buffer may allow data to be added to the "head" of the page descriptor ring buffer and released or overwritten from the tail of the page descriptor ring buffer. Accordingly, page descriptor ring buffer 120 may appear to be circular in that older data is overwritten with newer data as data (e.g., content 106) is moved from page buffer pool 118 to storage platform 102.

Storage Management Process:

As discussed above, various IO requests (e.g., IO request 20) may be sent from client applications 22, 24, 26, 28 to storage system 12. Examples of IO request 20 may include but are not limited to data write requests (e.g., write request 104 which is a request that content 106 be written to storage system 12) and data read requests (e.g., read request 108, which is a request that content 106 be read from storage system 12).

Figure 3:
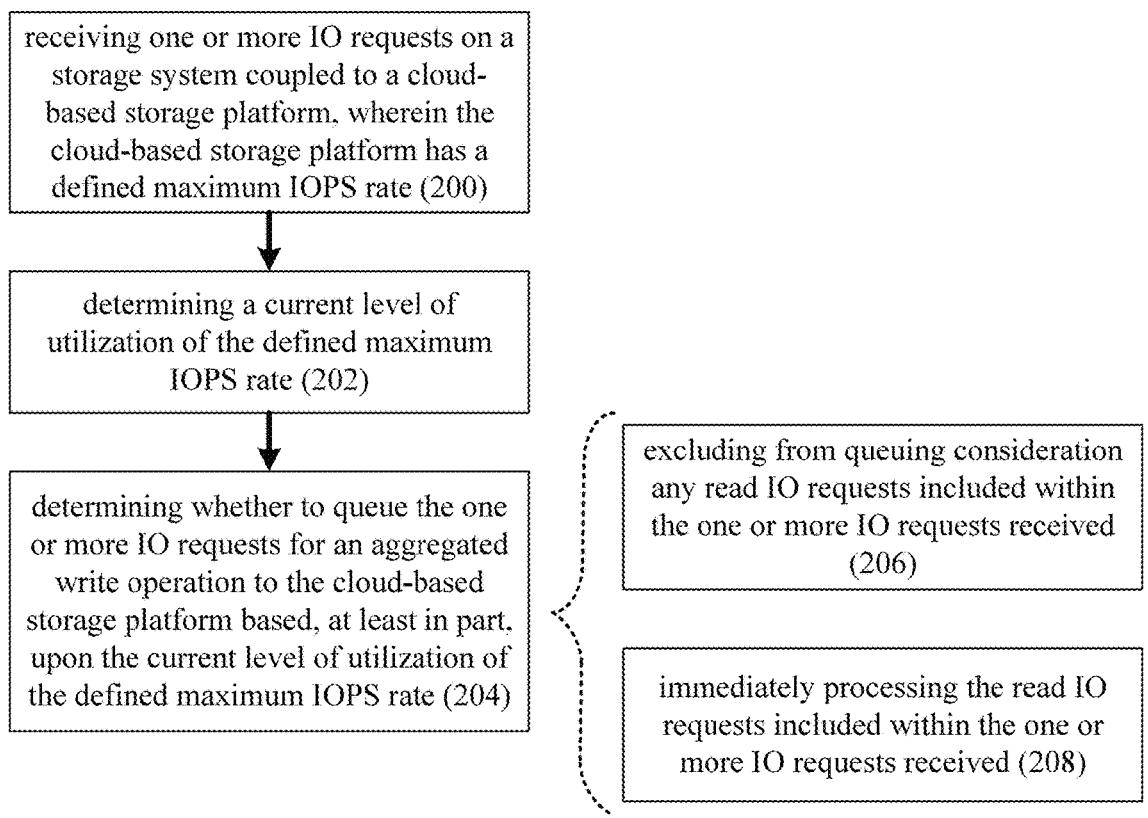
FIG. 3 is a flow chart of the storage management process of FIG. 1.

Accordingly and referring also to FIG. 3, storage management process 10 may receive 200 one or more IO requests (e.g., write request 104 and/or read request 108) on a storage system (e.g., storage system 12) coupled to a cloud-based storage platform (e.g., storage platform 102). As discussed above, cloud storage is a model of computer data storage in which the digital data is stored in logical pools, wherein the physical storage spans multiple servers (sometimes in multiple locations) and the physical environment is typically owned and managed by a hosting company.

For this particular example, assume that the cloud-based storage platform (e.g., storage platform 102) has a defined maximum IOPS rate, wherein this defined maximum IOPS rate may define a maximum number of IO operations per unit time. Typically, when utilizing a cloud-based storage platform (e.g., storage platform 102), access is granted to the user based upon such a defined maximum IOPS rate. Examples of such a defined maximum IOPS rate may include 1,000 IO operations per second, 2,000 IO operations per second, 3,000 IO operations per second, 5,000 IO operations per second, and 10,000 IO operations per second. The above examples of the defined maximum IOPS rate are for illustrative purposes only and are not intended to be a limitation of this disclosure, as other configurations are possible and are considered to be within the scope of this disclosure. For example, these numbers may be increased or decreased depending upon need/design criteria/technical capabilities. Naturally, as the quantity of IO operations per unit time increases, the fee for such access also increases. Accordingly, it is in the interest of the user to only purchase the quantity of IO operations per unit time they need. However, in the event that such quantity is reached, access is typically paused (e.g., throttled) until the unit time is reset. Therefore, assume for this discussion that the plan selected if for 2,000 IO operations per second. Further assume that during the first ¼ of a second (i.e., 250 milliseconds), you use those 2,000 IO operations. Accordingly, you are going to be paused (e.g., throttled) for the next ¾ of a second (e.g., 750 milliseconds) until the unit time period resets.

As will be discussed below in greater detail, in order to avoid the undesirable situation of getting paused (e.g., throttled), storage management process 10 may be configured to aggregate write operations to reduce the consumption of such IO operations. For example, cloud-based storage platform service providers often quantify an IO operation as the reading or writing of a defined quantity of data. A common value for this defined quantity is 256 kilobytes of data. However, this value is for illustrative purposes only and is not intended to be a limitation of this disclosure, as other configurations are possible and are considered to be within the scope of this disclosure. For example, this defined quantity may be increased or decreased depending upon the limitation/capabilities of the cloud-based storage platform (e.g., storage platform 102).

Accordingly, if you write 256 k of content to cloud-based storage platform (e.g., storage platform 102), that is one IO operation (e.g., of the 2,000 IO operations per second you are allowed). However, if you write only 4 k of content to the cloud-based storage platform (e.g., storage platform 102), that is also one IO operation (e.g., of the 2,000 IO operations per second you are allowed). Therefore, it may be beneficial to aggregate write operations to reduce the consumption of such IO operations. For example, sixty-four 4 k write operation may be aggregated to form one 256 k write operation, and the writing of this 256 k of aggregated data would only consume one IO operation (as opposed to sixty-four).

Unfortunately, aggregation introduces latency into storage system 12. However, if storage system 12 is a log-based storage system, the impact of such latency may be reduced, since (as discussed above) acknowledgement of the writing of data (e.g., content 106) associated with a write request (e.g., write request 104) may be made upon the related content being written to (in this example) log memory system 116. Accordingly, content may be aggregated in such a log memory system (e.g., log memory system 116) until such an aggregated write operation is performed.

Accordingly and once such IO requests (e.g., write request 104 and/or read request 108) are received 200 on storage system 12 coupled to the cloud-based storage platform (e.g., storage platform 102), storage management process 10 may determine 202 a current level of utilization of the defined maximum IOPS rate. As discussed above, assume that the defined maximum IOPS rate is 2,000 IO operations per second. The current level of utilization of the defined maximum IOPS rate (e.g., 2,000 IO operations per second) may identify the total IO requests and the breakdown between read IO requests (e.g., read request 108) and write IO requests (e.g., write request 104).

Once this current level of utilization of the defined maximum IOPS rate (e.g., 2,000 IO operations per second) is determined 202, storage management process 10 may determine 204 whether to queue the one or more IO requests (e.g., write request 104 and/or read request 108) for an aggregated write operation to the cloud-based storage platform (e.g., storage platform 102) based, at least in part, upon the current level of utilization of the defined maximum IOPS rate (e.g., 2,000 IO operations per second).

As will be illustrated bellow, the likelihood of queuing the one or more IO requests (e.g., write request 104 and/or read request 108) for the aggregated write operation to the cloud-based storage platform (e.g., storage platform 102) may generally increase as the utilization of the defined maximum IOPS rate is approached.

Below explains one manner in which the determination 204 may be made concerning whether to queue the one or more IO requests (e.g., write request 104 and/or read request 108) for an aggregated write operation to the cloud-based storage platform (e.g., storage platform 102) based, at least in part, upon the current level of utilization of the defined maximum IOPS rate (e.g., 2,000 IO operations per second).

- If the defined maximum IOPS rate is 25% utilized or less, IO requests (e.g., write request 104 and/or read request 108) received 200 on storage system 12 may not aggregated and are immediately processed.
- If the defined maximum IOPS rate is above 25% utilized and write IO operations constitute at least 20% of total OP operations; IO requests (e.g., write request 104 and/or read request 108) received 200 on storage system 12 may be aggregated for a maximum duration of 200 μs and/or until a maximum aggregation size of 32 k before such an aggregated write operation is performed on the cloud-based storage platform (e.g., storage platform 102).
- If the defined maximum IOPS rate is above 50% utilized and write IO operations constitute at least 25% of total OP operations; IO requests (e.g., write request 104 and/or read request 108) received 200 on storage system 12 may be aggregated for a maximum duration of 500 μs and/or until a maximum aggregation size of 64 k before such an aggregated write operation is performed on the cloud-based storage platform (e.g., storage platform 102).

If the defined maximum IOPS rate is above 75% utilized and write IO operations constitute at least 30% of total OP operations; IO requests (e.g., write request 104 and/or read request 108) received 200 on storage system 12 may be aggregated for a maximum duration of 800 μs and/or until a maximum aggregation size of 128 k before such an aggregated write operation is performed on the cloud-based storage platform (e.g., storage platform 102).

If the defined maximum IOPS rate is above 90% utilized and write IO operations constitute at least 40% of total OP operations; IO requests (e.g., write request 104 and/or read request 108) received 200 on storage system 12 may be aggregated for a maximum duration of 1000 μs and/or until a maximum aggregation size of 256 k before such an aggregated write operation is performed on the cloud-based storage platform (e.g., storage platform 102).

While the above-stated example illustrates five rules, this is for illustrative purposes only and is not intended to be a limitation of this disclosure, as other configurations are possible and are considered to be within the scope of this disclosure. For example, this rule set may be increased/decreased/modified based upon specific performance criteria/design choices.

Applying the above-described five rules:

If it is determined 202 that the current level of utilization of the defined maximum IOPS rate (e.g., 2,000 IO operations per second) is 400 IO requests having been received during the current time interval (i.e., 20% of 2,000 IO operations per second) and 20% of these 400 IO requests are write IO requests (e.g., write request 104); storage management process 10 may not aggregate and may process all IO requests immediately.

If it is determined 202 that the current level of utilization of the defined maximum IOPS rate (e.g., 2,000 IO operations per second) is 600 IO requests having been received during the current time interval (i.e., 30% of 2,000 IO operations per second) and 22% of these 600 IO requests are write IO requests (e.g., write request 104); storage management process 10 may aggregate for a maximum duration of 200 μs and/or until a maximum aggregation size of 32 k before such an aggregated write operation is performed on the cloud-based storage platform (e.g., storage platform 102).

If it is determined 202 that the current level of utilization of the defined maximum IOPS rate (e.g., 2,000 IO operations per second) is 1.100 IO requests having been received during the current time interval (i.e., 55% of 2,000 IO operations per second) and 27% of these 1,100 IO requests are write IO requests (e.g., write request 104); storage management process 10 may aggregate for a maximum duration of 500 μs and/or until a maximum aggregation size of 64 k before such an aggregated write operation is performed on the cloud-based storage platform (e.g., storage platform 102).

If it is determined 202 that the current level of utilization of the defined maximum IOPS rate (e.g., 2,000 IO operations per second) is 1.600 IO requests having been received during the current time interval (i.e., 80% of 2,000 IO operations per second) and 33% of these 1,600 IO requests are write IO requests (e.g., write request 104); storage management process 10 may aggregate for a maximum duration of 800 μs and/or until a maximum aggregation size of 128 k before such an aggregated write operation is performed on the cloud-based storage platform (e.g., storage platform 102).

If it is determined 202 that the current level of utilization of the defined maximum IOPS rate (e.g., 2,000 IO operations per second) is 1,900 IO requests having been received during the current time interval (i.e., 95% of 2,000 IO operations per second) and 45% of these 1,900 IO requests are write IO requests (e.g., write request 104); storage management process 10 may aggregate for a maximum duration of 1000 μs and/or until a maximum aggregation size of 256 k before such an aggregated write operation is performed on the cloud-based storage platform (e.g., storage platform 102). In this illustrative example, the maximum aggregation size is set to the maximum defined quantity of data for a single IO operation within the cloud-based storage platform (e.g., storage platform 102).

When determine 204 whether to queue the one or more IO requests (e.g., write request 104 and/or read request 108) for an aggregated write operation to the cloud-based storage platform (e.g., storage platform 102), storage management process 10 may exclude 206 from queuing consideration any read IO requests (e.g., read request 108) included within the one or more IO requests (e.g., write request 104 and/or read request 108) received.

As stated above, aggregation introduces latency into storage system 12. But if storage system 12 is a log-based storage system, the impact of such latency may be reduced, since (as discussed above) acknowledgement of the writing of data (e.g., content 106) associated with a write request (e.g., write request 104) may be made upon the related content being written to (in this example) log memory system 116. Unfortunately, such a log memory system (e.g., log memory system 116) does not mitigate latency with respect to read IO requests (e.g., read request 108). Accordingly, storage management process 10 may exclude 206 from queuing consideration any read IO requests (e.g., read request 108) included within the one or more IO requests (e.g., write request 104 and/or read request 108) received.

Accordingly and when determining 204 whether to queue the one or more IO requests (e.g., write request 104 and/or read request 108) for an aggregated write operation to the cloud-based storage platform (e.g., storage platform 102), storage management process 10 may immediately process 208 the read IO requests (e.g., read request 108) included within the one or more IO requests (e.g., write request 104 and/or read request 108) received.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing system, comprising:
   receiving one or more IO requests on a storage system coupled to a cloud-based storage platform, wherein the cloud-based storage platform has a defined maximum IOPS rate;
   determining a current level of utilization of the defined maximum IOPS rate; and
   determining whether to queue the one or more IO requests for an aggregated write operation to the cloud-based storage platform based, at least in part, upon the current level of utilization of the defined maximum IOPS rate,
   wherein determining whether to queue the one or more IO requests for the aggregated write operation to the cloud-based storage platform includes excluding from queuing consideration any read IO requests included within the one or more IO requests received.

2. The computer-implemented method of claim 1 wherein determining whether to queue the one or more IO requests for an aggregated write operation to the cloud-based storage platform includes:
   processing the read IO requests included within the one or more IO requests received.

3. The computer-implemented method of claim 1 wherein the likelihood of queuing the one or more IO requests for the aggregated write operation to the cloud-based storage platform is generally increased as the utilization of the defined maximum IOPS rate is approached.

4. The computer-implemented method of claim 1 wherein the defined maximum IOPS rate defines a maximum number of IO operations per unit time.

5. The computer-implemented method of claim 1 wherein the current level of utilization of the defined maximum IOPS rate identifies a total IO requests and a breakdown between read IO requests and write IO requests.

6. The computer-implemented method of claim 1 wherein the storage system is a log-based storage system.

7. A computer program product residing on a non-transitory computer readable medium having a plurality of instructions stored thereon which, when executed by a processor, cause the processor to perform operations comprising:
   receiving one or more IO requests on a storage system coupled to a cloud-based storage platform, wherein the cloud-based storage platform has a defined maximum IOPS rate;
   determining a current level of utilization of the defined maximum IOPS rate; and
   determining whether to queue the one or more IO requests for an aggregated write operation to the cloud-based storage platform based, at least in part, upon the current level of utilization of the defined maximum IOPS rate,
   wherein determining whether to queue the one or more IO requests for the aggregated write operation to the cloud-based storage platform includes excluding from queuing consideration any read IO requests included within the one or more IO requests received.

8. The computer program product of claim 7 wherein determining whether to queue the one or more IO requests for an aggregated write operation to the cloud-based storage platform includes:
   processing the read IO requests included within the one or more IO requests received.

9. The computer program product of claim 7 wherein the likelihood of queuing the one or more IO requests for the aggregated write operation to the cloud-based storage platform is generally increased as the utilization of the defined maximum IOPS rate is approached.

10. The computer program product of claim 7 wherein the defined maximum IOPS rate defines a maximum number of IO operations per unit time.

11. The computer program product of claim 7 wherein the current level of utilization of the defined maximum IOPS rate identifies a total IO requests and a breakdown between read IO requests and write IO requests.

12. The computer program product of claim 7 wherein the storage system is a log-based storage system.

13. A computing system including a processor and memory configured to perform operations comprising:
   receiving one or more IO requests on a storage system coupled to a cloud-based storage platform, wherein the cloud-based storage platform has a defined maximum IOPS rate;
   determining a current level of utilization of the defined maximum IOPS rate; and
   determining whether to queue the one or more IO requests for an aggregated write operation to the cloud-based storage platform based, at least in part, upon the current level of utilization of the defined maximum IOPS rate,
   wherein determining whether to queue the one or more IO requests for the aggregated write operation to the cloud-based storage platform includes excluding from queuing consideration any read IO requests included within the one or more IO requests received.

14. The computing system of claim 13 wherein determining whether to queue the one or more IO requests for an aggregated write operation to the cloud-based storage platform includes:
   processing the read IO requests included within the one or more IO requests received.

15. The computing system of claim 13 wherein the likelihood of queuing the one or more IO requests for the aggregated write operation to the cloud-based storage platform is generally increased as the utilization of the defined maximum IOPS rate is approached.

16. The computing system of claim 13 wherein the defined maximum IOPS rate defines a maximum number of IO operations per unit time.

17. The computing system of claim 13 wherein the current level of utilization of the defined maximum IOPS rate identifies a total IO requests and a breakdown between read IO requests and write IO requests.

18. The computing system of claim 13 wherein the storage system is a log-based storage system.

* * * * *